(12) United States Patent
Barone (10) Patent No.: US 7,451,576 B2
(45) Date of Patent: Nov. 18, 2008

(54) APPARATUS AND METHOD FOR FACILITATING ACCURATE PLACEMENT AND INSTALLATION OF MOLDING

(76) Inventor: Joseph Barone, 555 Cox Rd., San Marcos, CA (US) 92069

( * ) Notice: Subject to any disclaimer, the term of this patent is extended or adjusted under 35 U.S.C. 154(b) by 838 days.

(21) Appl. No.: 10/441,634

(22) Filed: May 19, 2003

(65) Prior Publication Data
US 2004/0231267 A1    Nov. 25, 2004

(51) Int. Cl.
E04D 1/36    (2006.01)
(52) U.S. Cl. .................... 52/463; 52/471; 52/288.1; 52/656.9; 403/402
(58) Field of Classification Search ............. 403/401, 403/402; 52/463, 471, 470, 287.1, 288.1, 52/656.9, 656.1
See application file for complete search history.

(56) References Cited

U.S. PATENT DOCUMENTS

| | | | |
|---|---|---|---|
| 2,666,508 A * | 1/1954 | Nardulli ............... 52/656.9 |
| 3,284,113 A * | 11/1966 | Howell ................ 403/267 |
| 3,329,451 A * | 7/1967 | Aeschliman .......... 403/402 |
| 4,023,293 A * | 5/1977 | Murray ................ 40/782 |
| 4,493,583 A * | 1/1985 | Wallace ............... 403/402 |
| 4,525,945 A * | 7/1985 | Shultz ................. 40/785 |
| 4,783,945 A * | 11/1988 | Heeg .................. 52/656.4 |
| 4,820,077 A * | 4/1989 | Sawada et al. ........ 403/402 |
| 4,860,814 A * | 8/1989 | Vilmann et al. ....... 160/381 |
| 5,179,811 A | 1/1993 | Walker et al. |
| 5,199,237 A | 4/1993 | Juntunen |
| 5,702,197 A * | 12/1997 | Chen .................... 403/166 |
| 5,829,206 A | 11/1998 | Bachman |
| 5,893,402 A | 4/1999 | Darling |
| 6,014,510 A | 1/2000 | Burks et al. |
| 6,173,542 B1 | 1/2001 | Wright |
| 6,179,515 B1 | 1/2001 | Grieser et al. |
| 6,216,407 B1 | 4/2001 | LeBlanc |
| 6,415,520 B1 | 7/2002 | Locklear |
| 6,530,183 B1 * | 3/2003 | Kuei-Yung ........... 52/204.1 |

OTHER PUBLICATIONS

Dunlop, et al., "Managing Complxity In IC Design—Past, Present and Future", Bell Labs Technical Journal, Autumn 1997, pp. 103-125.
"Hierarchical Static Timing Analysis Using Interface Logic Models", Synopsys, Jan. 2001, pp. 1-9.

* cited by examiner

*Primary Examiner*—Basil Katcheves (57) ABSTRACT

An apparatus and method for installation of molding is disclosed. With the apparatus and method, corner pieces are held in alignment during installation. This allows a person to hold both corner pieces in place with one hand while using the other hand to secure the molding to the wall or ceiling, thereby facilitating an accurate alignment. Moreover, use of an aligning member allows the installer to "fine-tune" the alignment of the corner pieces to fit unique contours of a desired wall corner. Before securing the molding to the wall, the corner pieces may be moved laterally or vertically along the aligning member to help find a perfect alignment. Several embodiments of the aligning member are disclosed, including members with varying angles for different corner segments, flexible members, and members with varying cross-sections.

16 Claims, 8 Drawing Sheets

APPARATUS AND METHOD FOR FACILITATING ACCURATE PLACEMENT AND INSTALLATION OF MOLDING

BACKGROUND OF THE INVENTION

This invention relates to an apparatus and method for accurate placement and installation of molding.

Molding is used as finish trim on walls either adjacent the floor and ceiling. This molding serves many different functions, including the decorative enhancement of a room and concealment of an intersection between a ceiling and walls. Molding placed adjacent to the floor is referred to as "base molding" and molding placed adjacent the ceiling is referred to as "crown molding." The installation of this molding at the corner intersection of two adjacent walls is notoriously difficult, sometimes requiring the cooperation of two or more workers. For example, at a 90-degree inside or outside corner segment of a room, it is a well-known and established practice to miter-cut an end of two separate pieces of molding strips at opposing 45-degree angles. With an end of each molding strip cut at 45-degrees, they form the required 90-degree angle when positioned adjacent each other at the corner segment of the room.

Installing these corner pieces is difficult because it is not always easy to orient molding pieces properly along the edge of the wall. During installation, these pieces often become misaligned and contain visible flaws. For example, installation of corner crown molding is typically done by holding one corner segment at an intersection of ceiling and wall while the molding is secured with nails or screws. The second corner segment is then installed adjacent the first corner piece. This imprecise method frequently results in inaccurate placement resulting in misalignment of intersecting crown molding segments at the corners of the room. This is particularly true when molding is secured with a hammer and nails since the impact of the hammer can move and cock the molding as it is secured to the wall and ceiling.

These imprecise joints at the corners are unattractive and detract from the appearance of the molding. As a result, installation of molding is usually too difficult for the average homeowner or do-it-yourselfer. Typically, the creation of properly aligned mitered joints at molding intersections requires the skills of an experienced coping carpenter who meticulously sculpts the ends of intersecting lengths of molding with a small coping saw to fit together and form the corner joint.

BRIEF SUMMARY OF THE INVENTION

To help solve these problems, the present invention mates the two corner pieces of molding with an aligning member such that both corner pieces are held together during installation. With the corner pieces held together by the aligning member, a person can use one hand to hold both corner pieces in place while using the other hand to secure the molding to the wall or ceiling. This helps increase the accuracy of the molding installation since both pieces are held at the corner at the same time. Use of the aligning member also allows an installer to readily see if shims or spacers are needed to make the alignment perfect between the corner pieces.

The aligning member may be used for any corner or section of wall that is at an angle. For example, the aligning member may be manufactured to hold two pieces of molding at a 90-degree angle for rooms with right angle corners or the aligning member may be manufactured to hold two pieces of molding at an angle other than 90-degrees depending on the shape of the walls and ceilings. If a room has a 45-degree corner, the installer would miter-cut an end of two separate pieces of molding strips at opposing 22.5-degree angles. The aligning member would then hold the two molding strips together at their adjacent ends forming a 45-degree angle between the two pieces of molding. This can be done for any corner angle encountered. Moreover, the molding may not need a miter-cut depending on the corner section encountered, the desired appearance of the molding or the type of molding used. The molding may even come pre-cut to the installer.

The aligning member may be made of any substance that can hold the weight of a piece of molding. This may be plastic, metal or any other substance with sufficient rigidity. The aligning member may also be made of a flexible substance as long as it is rigid enough to hold the molding pieces together while the installer is holding the molding against the wall during installation. This type of flexible aligning member is desirable since the angle between the corner pieces may be changed when the flexible aligning member is bent. Since wall intersections are many times not perfect, e.g. 85 instead of 90-degrees, a flexible aligning member would be able to accommodate the odd angles.

The aligning member may be made in many different configurations or forms. All that is important is that the aligning member joins the two corner molding pieces together allowing for easier and more accurate installation. In one embodiment, the aligning member is a singular piece of material with two arms each having a proximal and distal end, where the proximal ends come together at an angle. The aligning member is not limited to "two-arm" embodiments however; any number of arms may be present. Each arm also has a length between its proximal and distal ends such that it can engage a precut groove or hole within an end of the molding. In another embodiment, the aligning member resembles a two-headed dowel, having two circular arms that engage the molding within circular grooves or holes. In another embodiment, the aligning member is a singular piece of material with a rounded inside surface and two straight segments extending from the rounded inside surface, wherein each straight segment is inserted into an opening cut into an end of a piece of molding. In other embodiments, the aligning member may be rectangular, resembling a rectangular piece of material bent somewhere in a middle portion of the rectangle such that there are at least two rectangular arms for placement within the molding ends. In another embodiments, the aligning member may have a circular surface resembling a biscuit and bent in a way as to provide at least two arms for placement within the molding ends. In yet other embodiments, the arms may be tapered.

Use of the aligning member also allows the installer to adjust the alignment of the corner pieces to fit within unique contours of a desired wall corner. Since construction is an imprecise art, wall intersections are often imperfect. A certain amount of "fine-tuning" is therefore necessary to achieve accurate alignment between two pieces of molding. With the aligning member in place, the corner pieces may be slightly adjusted relative one another, facilitating perfect alignment at the actual wall corner. In an embodiment of the aligning member with two straight elongated arms, the molding may be slightly adjusted by sliding the molding along the length of the arm. This is a form of lateral adjustment of the corner joint. In another embodiment of the aligning member having two rectangular arms, the molding may be slightly adjusted by sliding the molding along the length of the rectangular arm. It is also possible to have curved arms on the aligning member.

Fine adjustment of the corner pieces in the vertical direction may be accomplished by cutting the receiving hole within an end of the molding larger than the cross-section dimension of an arm of the aligning member. For example, cutting a hole that is wide enough to receive the aligning member arm but is slightly larger in the vertical direction on either side of the arm will allow a certain amount of movement that can be used to vertically fine adjust the corner pieces.

If perfect alignment is not possible, however, the use of the aligning member also allows an installer to readily see if shims or spacers are needed to make the alignment perfect between the corner pieces. This is because the aligning member holds the molding pieces together as the installer adjusts and aligns the molding within the desired corner.

Finally, manufacturing an aligning member, miter-cutting molding, and cutting receiving holes within the molding for an aligning member is within the ordinary skill in the art. For example, the aligning member may be made with any suitable manufacturing process depending on the material chosen. If the aligning member is to be made of plastic or metal, a casting mold in the shape of the aligning member may be used. Moreover, the cuts or holes made to the molding may be made with any suitable saw or drill. For example, a miter saw may be used to create miter-cut ends.

As for cutting the receiving holes for the aligning member arms, a doweling jig, drill jig or biscuit cutter may be used. The cutting device may have to be suitably adapted, however, for use with molding. For example, the stops or guides of a jig may need to be configured to receive the particular molding used. This may need to be done when using oddly shaped molding or when using a cutting device not designed particularly for use with molding. Furthermore, these stops or guides must be set in order to drill holes into each piece of molding in an exact and repeatable manner so that the holes intersect when the molding pieces are put together, creating an alignment between the molding pieces once the aligning member is inserted. Similarly, if a biscuit cutter is used, it must be configured so that the grooves cut into each corresponding molding piece match, thereby providing an area of intersection between the molding pieces for insertion of the aligning member. But regardless of the cutting device used, as long as there is an area of intersection between the receiving holes of the corresponding molding pieces that is large enough for the aligning member when the molding pieces are placed end-to-end, the aligning member will orient the molding pieces and hold them together during installation.

The novel features of the present invention are disclosed in the following detailed description and referenced drawings. It is, however, only explanatory and is in no way intended to limit the scope of the invention.

BRIEF DESCRIPTION OF THE DRAWINGS

FIG. 1 is an exploded view of two pieces of molding for an outside corner with an aligning member in between;

FIG. 3 is an exploded view of two pieces of molding for an inside corner with an aligning member in between;

FIG. 6 is an exploded view of two pieces of molding for an outside corner with an alternate embodiment of the aligning member in between;

DETAILED DESCRIPTION OF THE INVENTION

Figure 1:
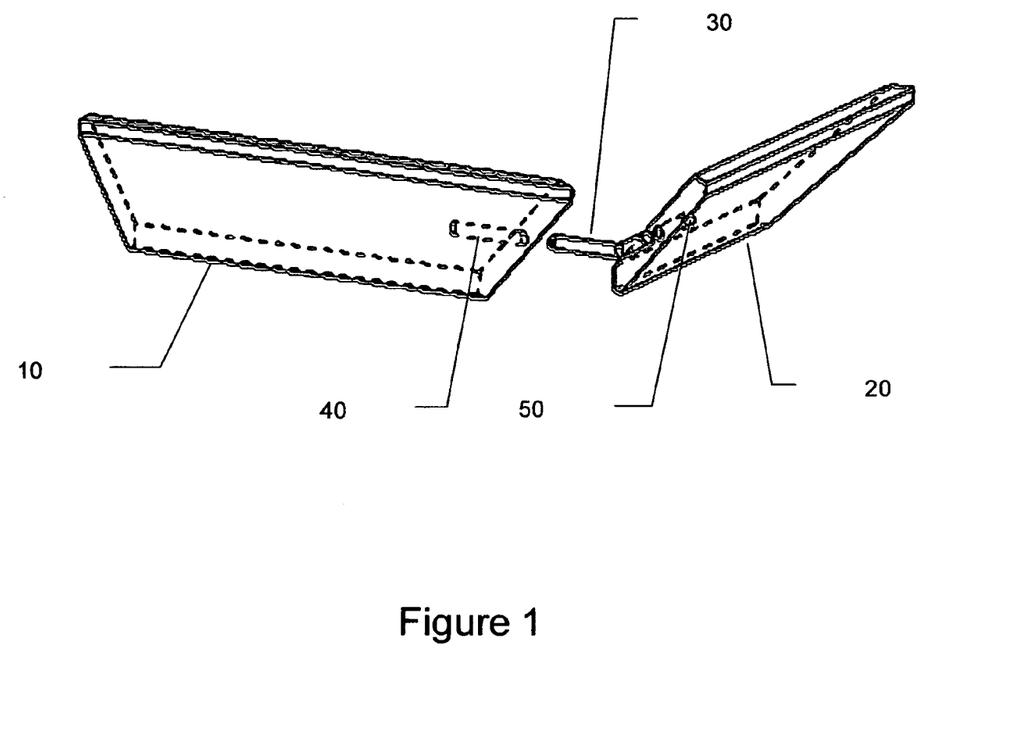
Figure 2:
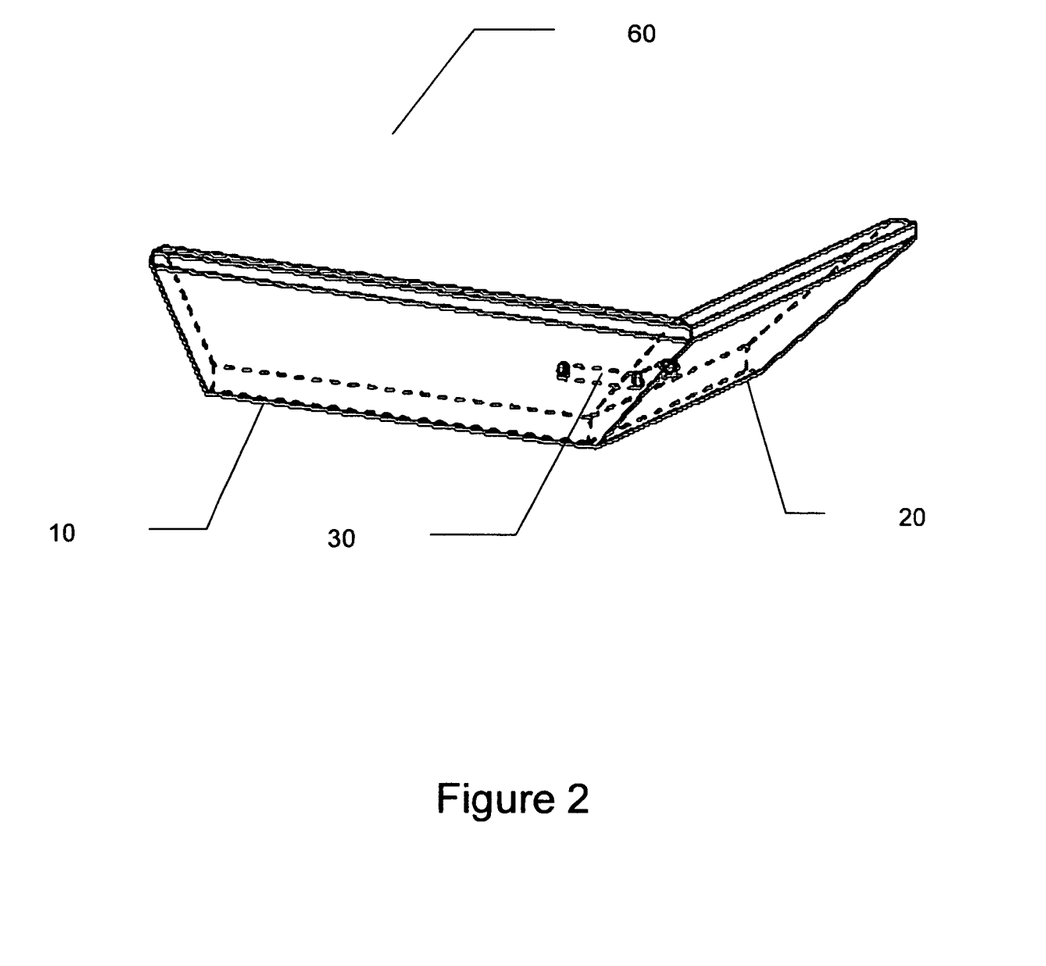
FIG. 2 is an assembled view of two pieces of molding joined together by an aligning member forming an outside corner.

Referring to FIG. 1, an exploded view of two pieces of molding 10, 20 that will form an outside corner is shown with an embodiment of an aligning member 30 in between. Each piece of molding 10, 20 has a receiving hole 40, 50 drilled into its end to allow insertion of an arm of the aligning member 30. As shown in FIG. 2, once assembled, the two pieces of molding will be held together by aligning member 30 allowing an installer to hold the assembled corner 60 with one hand and secure the assembled corner 60 to the wall, ceiling or floor with the other hand.

Figure 3:
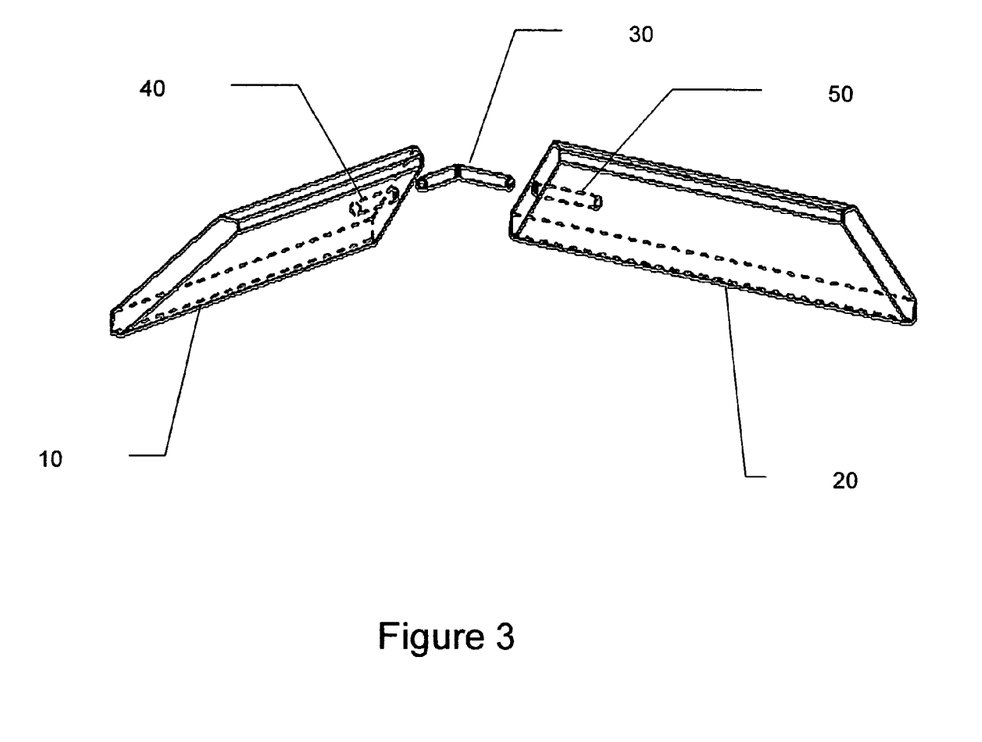
Figure 4:
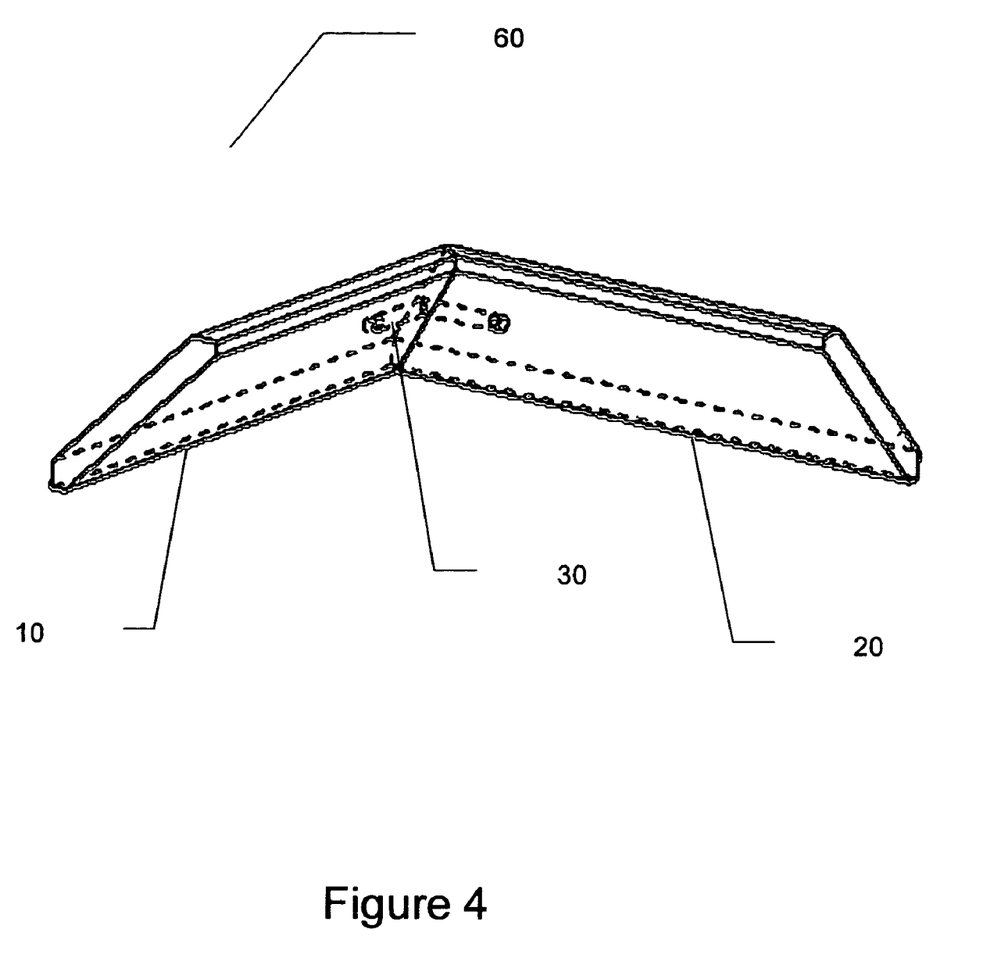
FIG. 4 is an assembled view of two pieces of molding joined together by an aligning member forming an inside corner.

As depicted in FIGS. 1 and 2, an embodiment of the aligning member 30 resembles a "two-headed dowel" having arms with a circular cross-section and an angle formed between the two arms. The length of the arms must be sufficiently long and the arms must be sufficiently strong to hold the weight to a piece of the molding since only one piece of the molding may be otherwise supported during installation. FIGS. 3 and 4 show the aligning member 30 being used to form an inside corner with two pieces of molding.

Figure 5:
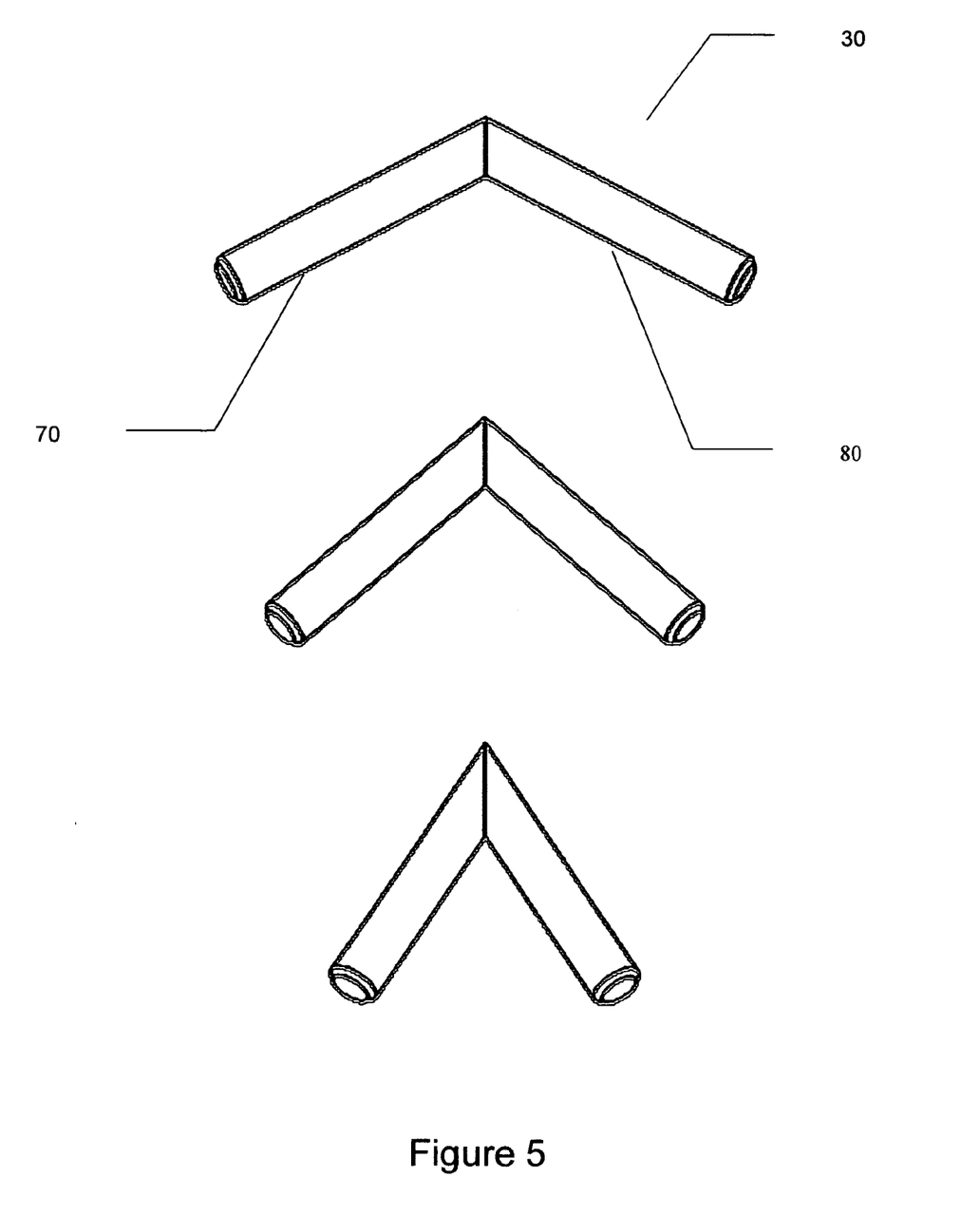
FIG. 5 are side views of several embodiments of the aligning member with various angles formed between the arms.

Numerous alternative embodiments of the aligning member 30 are possible, all of which perform an intended function of the invention. For example, FIG. 5 shows how the angle formed between the arms 70, 80 of the aligning member 30 may vary depending on the angle of the corner encountered. If the wall intersection had an angle of 90-degrees, than an aligning member with a 90-angle between the arms is appropriate. Alternatively, if the wall intersection was at 45-degrees or 120-degrees or any other possible variation, then the appropriate angle between the arms 70, 80 of the aligning member 30 may be chosen. Moreover, the aligning member 30 may be made of a flexible material that would be adjustable to the unique angle of the desired corner. With this embodiment, the material of the aligning member 30 would be flexible enough to allow adjustment of the angle but rigid enough to hold that angle of the assembled corner during installation.

Figure 6:
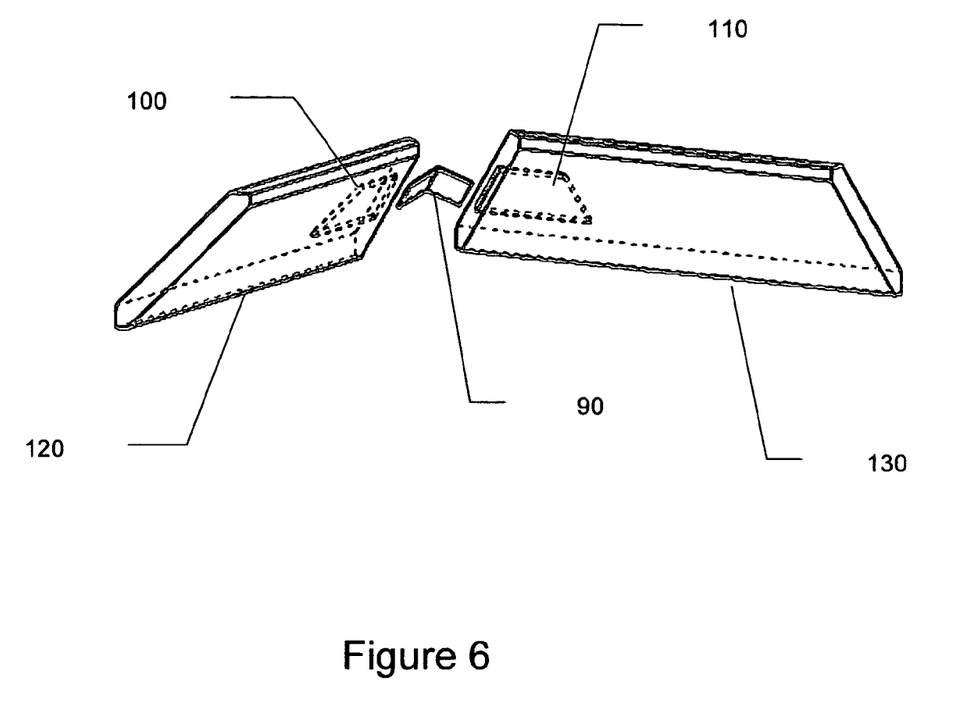
Figure 7:
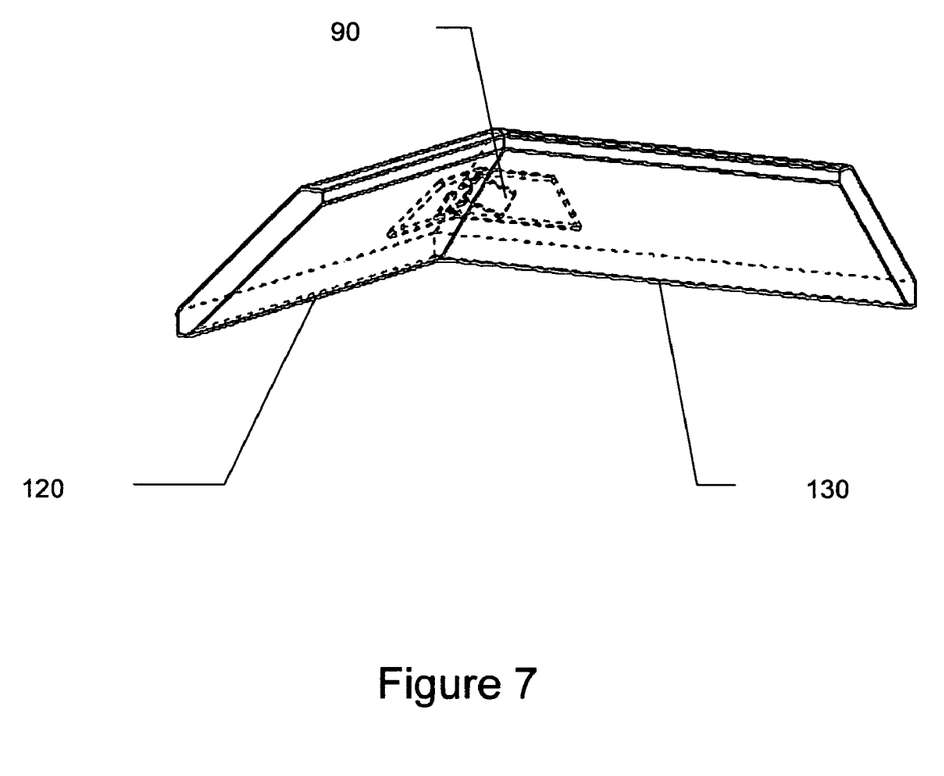
FIG. 7 is an assembled view of two pieces of molding joined together by an alternate embodiment of the aligning member forming an outside corner.

The aligning member 30 may also take on a variety of shapes that all perform the intended function of the invention. For example, FIG. 6 is an exploded view of two pieces of molding 120, 130 for an outside corner with an alternate embodiment of the aligning member 90 in between. In this embodiment, the aligning member 90 has rectangular shaped arms instead of the circular shaped arms of the aligning member 30. These rectangular shaped arms fit inside slots 100, 110 cut into each end of the molding 120, 130. FIG. 7 is an assembled view of the two pieces of molding 120, 130 joined together by the aligning member 90 forming an outside corner. In other embodiments, the aligning member 90 may take on a variety of shapes or forms. There may be more than two arms and the arms may come in any shape or form that could be placed within an end of a piece of molding. As long as the aligning member 90 holds that molding pieces 120, 130 together during installation, a function of the invention is performed.

Figure 8:
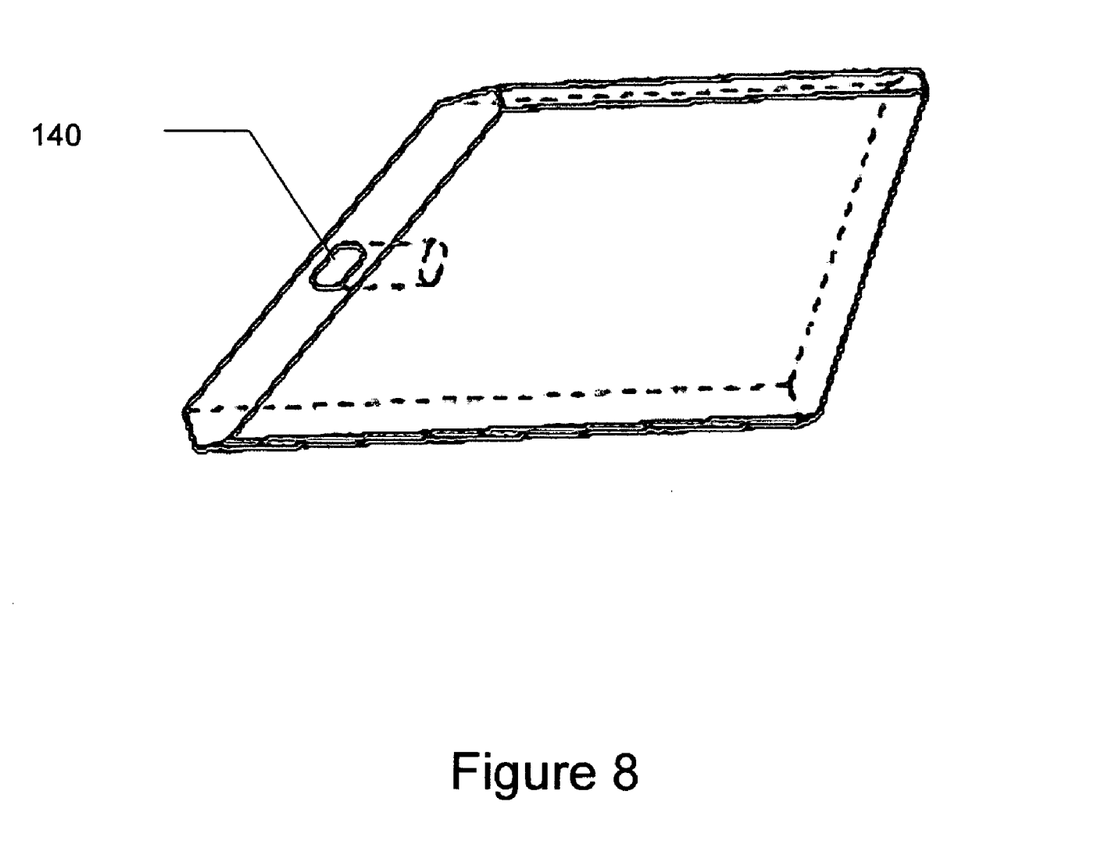
FIG. 8 is a sectional view of a piece of molding with a receiving hole cut into an end for an aligning member where the receiving hole is lengthened to allow vertical adjustment.

Not only does the aligning member 30, 90 allow an installer to hold both pieces of molding with one hand during installation; it also allows the installer to make fine-adjustments to the alignment of the molding pieces before securing them to the wall. For example, Referring to FIGS. 1 and 2, once the installer has formed the assembled corner 60, there is an amount of fine-adjustment possible along the length of the arms of the aligning member 30. Moving or sliding molding 10 or 20 along the length of the aligning member 30 within the receiving holes 40, 50 helps an installer achieve an accurate alignment between the molding pieces 10, 20 and a wall intersection. This same sort of lateral adjustment may also be done with aligning member 90 within receiving holes 100, 110 in FIGS. 6 and 7. Moreover, as depicted in FIG. 8, a receiving hole 140 may be lengthened to allow vertical adjustment between the molding pieces. Rather than having the cross-sectional dimensions the same for the receiving holes 40, 50 and the arms of the aligning member 30, as shown in FIGS. 1–4, the receiving hole 140 may be larger, as depicted in FIG. 8. FIGS. 6 and 7 similarly depict receiving holes 100, 110 being larger than aligning member 90 in the vertical dimension. With the extra length, the molding pieces may be adjusted in the vertical direction by sliding the molding pieces relative to one another along the aligning member within the larger receiving hole. Using this embodiment, perfect alignment between the molding and wall corner becomes much easier for the installer.

Finally, the receiving holes 40, 50 drilled or cut into the ends of the molding pieces 10, 20 may be parallel to a length of the molding (as depicted) or may be perpendicular or at an angle to a flat plane of the end (not depicted). If the receiving holes 40, 50 are parallel to the length of the molding, then the angle between the arms of the aligning member should approximate the angle of the wall intersection or the angle formed between the two ends to be joined. If however the receiving hole is not parallel to the length of the molding, the angle between the arms of the aligning member 30 will need to be adjusted to accommodate any difference in angle between the receiving holes 40, 50 and the actual angle of the wall intersection or ends of the molding 10, 20.

The foregoing detailed description of the present invention is illustrative and explanatory. Various changes in the details of the illustrated construction may be made within the scope of the following claims without departing from the spirit of the invention. The present invention should only be limited by the following claims and their legal equivalents.

What is claimed is:

1. A fastener in combination with two or more pieces of molding installed at an intersection of two walls, wherein the fastener comprises an inside segment and two substantially straight segments extending at an angle from the inside segment, wherein at least a portion of said inside segment of the fastener is an adjustable portion configured to allow adjustment of said angle during installation of said molding to said intersection of two walls, wherein the adjusted angle is retained by the fastener after the adjustment, wherein at least one receiving hole is cut into each piece of molding and a straight segment of the fastener is inserted into a receiving hole of each piece of molding, wherein the angle of the fastener and molding pieces combination is adjustable to fit an angle at said intersection of two walls by bending the adjustable portion of the fastener, wherein the adjusted angle is retained by the fastener and wherein said molding and fastener combination are installed to said intersection of two walls wherein each straight segment of the fastener has a rectangular cross-section.

2. The combination of claim 1, wherein each receiving hole is cut parallel to a length of the molding.

3. The combination of claim 1, wherein each receiving hole has a vertical dimension larger that a cross-sectional dimension of the straight segments of the fastener.

4. The combination of claim 1, wherein the inside segment has a rounded surface.

5. The combination of claim 1, wherein said at least a portion of said inside segment of the fastener comprises a flexible material.

6. The combination of claim 1, wherein said intersection of two walls comprises a corner surface.

7. The combination of claim 1, further comprising at least one more adjustable fastener in combination with said two or more pieces of molding for installation at said intersection of two walls.

8. A method of installing molding, the method comprising:
cutting a receiving opening into an end segment of at least two pieces of molding;
inserting a portion of a clip into each receiving opening so that the molding pieces are held together by the clip, wherein the clip comprises an inside segment and two substantially straight segments extending at an angle from the inside segment, wherein at least a portion of said inside segment of the clip is made of a flexible material wherein said angle may be adjusted, wherein the adjusted angle is retained by the flexible material after the adjustment;
holding the molding to a desired wall corner segment comprising an angle;
adjusting the flexible portion of the clip until the molding and clip combination is aligned with the angle of the wall corner segment, wherein the flexible portion of the clip is configured to retain the adjustment without being held in place; and
securing both pieces of molding to the wall segment.

9. The method of claim 8, further comprising the step of miter-cutting an end of each molding piece wherein the receiving opening is cut.

10. The method of claim 9, wherein the receiving openings are cut at an angle to a plane perpendicular to the miter-cut end.

11. The method of claim 9, wherein the receiving openings are cut parallel to a length of the molding.

12. The method of claim 8, wherein the receiving openings have a vertical dimension larger than a cross-sectional dimension of the portion of the clip inserted into the receiving openings, thereby allowing adjustment in the vertical dimension.

13. The method of claim 8, wherein each portion of the clip inserted into the receiving openings has a circular cross-section.

14. The method of claim 8, wherein each portion of the clip inserted into the receiving openings has a rectangular cross-section.

15. The method of claim 8, wherein said securing both pieces of molding to the wall segment comprises inserting a fastener through the molding into the wall.

16. The method of claim 15, wherein said fastener comprises at least one of the following: a nail or a screw.

* * * * *